… [19]   [11] 3,851,529
[45] Dec. 3, 1974

[54] DIAL THERMOMETER
[75] Inventors: Richard A. Andrews, Taylor; Ralph B. Remick, Jr., Farmington, both of Mich.
[73] Assignee: H. O. Trerice Co., Oak Park, Mich.
[22] Filed: Dec. 13, 1972
[21] Appl. No.: 314,543

[52] U.S. Cl................ 73/362.8, 73/363.7, 73/430
[51] Int. Cl. ........................................... G01k 1/16
[58] Field of Search................ 73/362.8, 430, 363.7

[56] References Cited
UNITED STATES PATENTS

| 2,569,311 | 9/1951 | Hoare | 73/430 |
| 2,572,059 | 12/1951 | Schlaich | 73/362.8 |
| 3,460,389 | 8/1969 | Lamb | 73/363.7 |
| 3,592,059 | 7/1971 | Chilton | 73/362.8 |

Primary Examiner—Herbert Goldstein
Assistant Examiner—Denis E. Corr
Attorney, Agent, or Firm—Whittemore, Hulbert & Belknap

[57] ABSTRACT

The thermometer is a surface contact type embodying a flat coiled bimetallic sensing element fixedly connected at its center convolution to the shaft of a pointer which swings in a plane forwardly paralleling a calibrated read-off dial. The end of the outermost coil convolution is anchored in a space rearwardly closed and sealed by a thin heat sensing plate of aluminum or other metal having good thermal conductivity; and a charge of a suitably viscous, thermally stable liquid also having a good heat conductivity factor is placed within said space. The quantity or mass of the charge is such that it will always have contact with and at least partially immerse a substantial convolution area of the bimetallic coil, as well as to have and maintain direct heat transmissive contact with the rear sensor plate of the instrument, without regard to the orientation of the latter horizontal-wise, vertical-wise, or at intermediate angularity. A typical appropriate fluid is silicone in a predetermined viscosity; and as thus disposed in unfailing heat conducting contact with the back plate and the bimetallic sensor coil the charge (a) acts to dampen undue vibration of the thermometer's pointer, as received by the latter through its shaft connection to the coil; and (b) much enhances the transmission of heat between the monitoring sensor and the coil element. The fluid silicone is sealed against escape from the plate-defined space receiving the coil movement or sub-assembly, i.e., to the fore by a special grease lubricant effecting a liquid seal between the pointer shaft and a dial bushing journaling said shaft, and to the rear by a force fit of the plate to the body of the movement; and appropriate vent hole means in said body prevents the building up of air pressure, due to the force-fit assembling operation, to a degree apt to cause leakage of the silicone.

4 Claims, 2 Drawing Figures

3,851,529

DIAL THERMOMETER

BACKGROUND OF THE INVENTION

1. Field of the Invention

The improved thermometer finds application in the temperature-monitoring of many different objects, in particularly masses, such as an engine block, presenting only a flat surface for monitoring and not practical to probe otherwise than by surface conduction, i.e., by conventional capillary column, bulb-type and other instruments. Uses in measuring or monitoring the temperature of fluid or semi-rigid bodies or masses are also contemplated.

2. Description of the Prior Art

The U.S. Pat. to Argabrite, No. 2,701,964, of Feb. 15, 1955, has been noted as disclosing a surface thermometer for uses such as are herein contemplated; and it suggests the use of a coating of lamp black on the inner surface of a back sensor plate to expedite transmission of heat (but by air convection) from that plate to a bimetallic sensor. Another U.S. Pat. to the same individual, No. 2,771,775 of Nov. 27, 1956, also relates even less to the point to a bimetallic coil surface thermometer having a magnetic attraction feature. These two patents are the most pertinent of which we are aware.

SUMMARY OF THE INVENTION

Considerable difficulty has been encountered by us in developing a flat base or surface contact type of standard bimetallic coil sensor design which will, in an inexpensive construction, faithfully transmit temperature from the heat sensing plate surface of the instrument to the bimetallic movement or sub-assembly without basic or sole reliance on convective ambient air, and which will also be to a great degree proof against vibratory instability, due to the nature of the bimetallic coil and resulting in flickering or hesitation of the instrument's pointer in traversing a temperature range in one direction or the other. These drawbacks are characteristic of existing low-cost, and consequently relatively low quality, instruments. It is therefore in such respects of performance in the faithful, sensitive and rapid monitoring of heat change and much improved pointer stability that the improved thermometer approaches the performance of a precision-designed high-cost instrument.

To these ends the essential improvement contemplates the placing of a predetermined charge of the viscous silicone, or an equivalent agent, in intimate heat transfer contact over substantial areas, if not all of the area, of the aluminum back plate and bimetallic coil, thus establishing between these two a degree of heat conductivity and responsivity far greater by comparison than is the case in a convection transfer in a normal ambient air atmosphere.

However, in our earlier work attempts to effectively seal the thermal transmission and dampening liquid against escape were not entirely successful; and in practicing the invention a bit later, a telescoped and force-fitted engagement of the sensitive aluminum back plate in the body encasing the instrument's movement was arrived at. However, it was found that in consequence of the compressed air within the instrument case leakage of the silicone fluid occurred, both rearwardly in the area of the back plate and forwardly through the pointer shaft's bore to the instrument's dial face.

Accordingly, the improvement eliminates the dual leakage drawback by affording both a force-sealed plate mounting having air vent means from the interior of the coil space, and by setting up a liquid seal between the pointer shaft and the dial-carried bushing in which the shaft is journaled.

DESCRIPTION OF A PREFERRED EMBODIMENT

Figure 2:
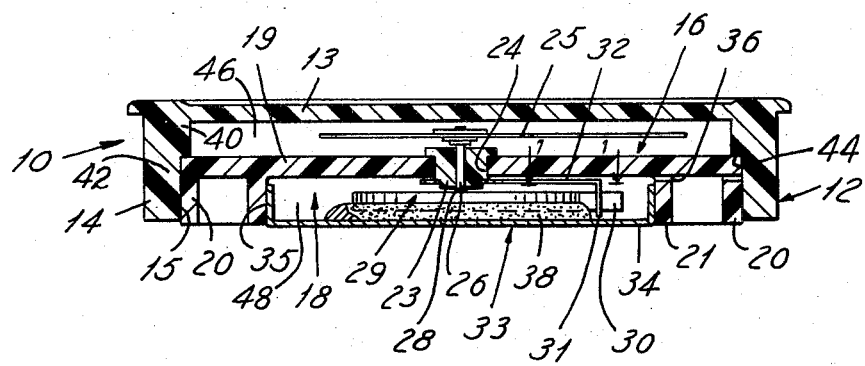
FIG. 2 is a view in cross section on line 2—2 of FIG. 1, i.e., in a plane including the pointer axis.

The instrument of the invention, as generally designated by the reference numeral 10, comprises a circular outer case or casing 12, preferably molded inexpensively of an appropriate synthetic plastic composition, for example, a typical polycarbonate such as "Lexan", to present a transparent face 13 and an annular, axially rearwardly extending integral flange 14. This flange 14 is molded with a rear counterbore at 15 which telescopically receives the circular inner mounting body 16 of a thermo-sensitive bimetallic coil and pointer movement or sub-assembly, such unit being generally designated by the reference numeral 18. The flange 14 has inner and outer flange portions 40 and 42. The inner surface of the outer flange portion 42 is formed on a larger diameter than the inner surface of the inner flange portion 40 as illustrated in FIG. 2. The inner surfaces of flange portions 40 and 42 are connected by an annular locating shoulder 44 which is generally parallel to the transparent face 13.

Figure 1:
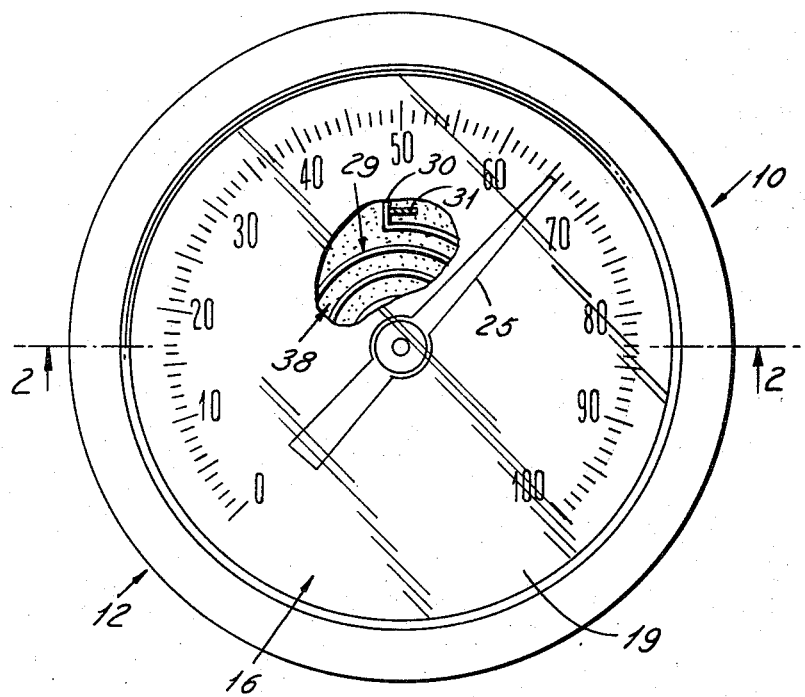
FIG. 1 is an elevation, partially broken away, of the improved thermometer of the invention, being in transverse section as indicated by line 1—1 in FIG. 2.

The movement's body 16 is inexpensively molded from the same type plastic as the instrument's case 12, i.e., the "Lexan" polycarbonate; but is in this instance preferably opaque or translucent, affording a circular dial face 19 appropriately marked with the conventional Fahrenheit temperature calibrations appearing in FIG. 1. The movement's molded body 16 also provides concentric circular outer and inner, axially rearwardly extending ribs or flanges 20, 21 respectively, the former of which mates snugly in the counterbore 15 of instrument case 12, in which it has a leak-tight adhered connection, as through the agency of a coating of methylene chloride. The forward surface of the dial face 19 abuts the annular locating shoulder 44 when outer casing 12 and inner mounting body 16 are assembled as shown in FIG. 2. The nature and purpose of the inner flange or rib 21 are hereinafter described.

The bimetallic coil and pointer movement 18, as preassembled to its molded mounting body 16, comprises a plug-like cylindrical bushing 23 force-fitted in a central aperture 24 of dial face 19, an indicator finger or pointer 25 being disposed forwardly of said face in a first compartment 46, as adjustably mounted conventionally for pre-setting to a small arbor, stub-shaft or shaft 26. The latter is anti-frictionally journaled in a center bore of bushing 23, preferably through the agency of a special sealant and lubricant composition later mentioned.

Rearwardly of bushing 23 the shaft 26 has a fixed connection at 28 to the center-most convolution of a conventional thermo-sensitive bimetallic sensor coil 29, for example, one having an "Invar" low expansion side component, which coil at its outermost convolution presents a radially outwardly projecting finger or tang 30. This element is engaged by the 90° offset finger 31 of a stamped radially extending stop element 32, the inner end of which is fixedly mounted to bushing 23; and finger 31 thus serves as an anchor at which the coil 29 is rotatively restrained. Thus in its conventional expansion and constriction under temperature change the coil 29 transmits proportional rotation in torsion to pointer 25 through the latter's pointer shaft 26.

The movement 18 may be considered to be completed by a thermally sensitive machined back plate or plate member 33 of thin gauge aluminum, which plate is characterized by a circular sensor panel part 34 from which an integral annular flange or rim 35 extends 90° forwardly as shown in FIG. 2.

In the final assembly of back plate 33 to the remainder of the coil and pointer movement 18, the circular flange 35 of back plate 33 has a force-fit within the circular inner rib 21 of the movement's encasing body 16, the degree of axial insertion being such as to bring the plate's rear panel 34 substantially flush with the rear of the instrument, hence insuring a full flat-wise sensing contact of plate 33 with a surface, body or mass to be heat-monitored. The dial face 19 and plate member 33 when assembled as shown in FIG. 2, define a second compartment 48 for the coil 29 and the metered charge or mass 38 to be subsequently described. The proportioning of plate 33 is such that its forward flange edge lies a bit to the rear of the dial face part 19, yet with the panel 34 of said sensor plate still a bit to the rear of bimetallic coil 29, so as not in any degree to mechanically impede a free torsional motion of the latter.

In order to avoid entrapment and undue compression of air forwardly of back plate 33 in its force-fit assembly as thus described, the inner circular flange or rib 21 of movement body 16 is formed with one or more small vent holes 36, through which compressed air may escape to the exterior of the instrument, thus avoiding leakage of the sort referred to in the Abstract and the Summary.

Finally, an essential feature of the invention resides in the provision prior to final assembly of back plate 33 of a metered charge or mass 38 of the selected silicone or equivalent dampening and thermal heat-transmission-promoting fluid. Simply for the purpose of conventional illustration, charge 38 appears as a relatively thick mass overlying a major area portion of back plate panel 34. This is one position it may normally take in the illustrated horizontal disposition of the plate 33 and under a contemplated characteristic of the charge as to viscosity. Naturally, however, the charge or mass 38 will have different distributions depending upon different charge selections and/or orientations of plate 33; and this will of course occur frequently either in actual use or between uses. What is controlling is the fact that the selected transfer and stabilizing agency is present in a volume or quantity sufficient that it will directly contact substantial areas of the convolutions of bimetallic element 29 and also a substantial internal area of back plate 33 at the critical sensor panel 34 of that plate. The result is that direct lines of heat conductivity are established and maintained between plate and coil, and that the latter is sufficiently but not obstructively dampened in its response to heat change to prevent undue vibration, hesitation, or flicker of pointer 25 in traversing the dial face 19. We find that, for a relatively low range of temperature monitoring, i.e., zero to 100° F, a silicone fluid charge having a viscosity of the order of 100,000 centistokes is appropriate, and that for a relatively high range of, say, 70° to 250° F, a viscosity of 500,000 centistokes is appropriate.

Sealing action as between pointer shaft 26 and the bore of bushing 23, in respect to possible escape of the silicone fluid to the dial face 19 is insured by the application in this journal zone of an appropriate lubricant, such as a lithium-based grease, having a desirable sealant characteristic.

It should be appreciated that the bimetal is thermally insulated from ambient effects by the case 12, dial face 19, a dead air space between the face 13 and dial face 19 and a dead air space between flange 20 and flange 21.

What is claimed is:

1. A thermometer of the surface contact type comprising a circular outer casing having an axis, said casing including a generally flat transparent face and an axially and rearwardly extending integral and annular flange including inner and outer flange portions, the inner surface of the outer flange portion being formed on a larger diameter than the inner surface of the inner flange portion, the inner surfaces of said inner and outer flange portions being connected by an annular locating shoulder which lies in a plane which is parallel to said transparent face, a circular inner mounting body including a generally flat, circular readoff dial face calibrated in temperature values and a pair of concentric outer and inner axially and rearwardly extending integral and annular ribs, said ribs being spaced apart and connected only on the forward ends thereof by said dial face, the space between said ribs being open to the atmosphere, said inner mounting body being received in said outer casing, with the outer periphery of said circular face abutting the annular locating shoulder of said circular outer casing and with said outer rib in surface to surface contact with the inner surface of the outer flange portion rearwardly of said locating shoulder, said circular dial face being spaced from said flat transparent face to define with said inner portion of said flange a first compartment which is closed to atmosphere, a relatively flat thermally sensitive conductive plate of a thin gauge metal material, said plate including a circular sensor panel part and an axially and forwardly extending integral annular rim which is received in and has a force-fit with said inner rib of said inner mounting body, said sensor panel part being adapted to be exposed in flat-wise conducting contact with a body which is to be heat-monitored, said plate member being spaced from said dial face to define a second compartment, a substantially flat coiled bimetallic sensing member in said second compartment having an outer end fixedly mounted on the side of said sensor panel part opposite said contact surface of the latter, and an inner end substantially coplanar with said outer end and responding flexibly and rotatively to variations in temperature of the body which is to be heat-monitored as conductively transmitted by said sensor panel part, an indicator in said first compartment overlying said dial face, a shaft located on said axis and extending through said dial face in sealed relation therewith into said first and second compartments and connecting said indicator in said first compartment to said inner end of the center-most convolution of said sensing member in said second compartment, said indicator being movable rotatively with said inner end of said sensing member and concurrently with coiling flexure of said sensing member so as to move across said dial face, a mass of highly heat-conductive fluid material in said second compartment contacting said sensor panel part of said plate member, in which mass said coiled sensing member is substantially immersed sufficiently to enhance heat transmission between said sensor panel part and said sensing member and to dampen vibration of said indicator and of said sensing member in its flexure.

2. The thermometer defined in claim 1 including vent means extending laterally through said inner rib of said inner mounting body adjacent said dial face for connecting said second compartment with the exterior of the thermometer to relieve internal gaseous pressure in said second compartment.

3. The thermometer defined in claim 1 wherein said outer casing and said inner mounting body are made from a plastic material and said sensitive conductive plate is made from aluminum.

4. The thermometer defined in claim 1 wherein said sensor panel part extends rearwardly beyond said annular flange.

* * * * *